United States Patent
Chaney et al.

[15] 3,665,823
[45] May 30, 1972

[54] ROLLER-ATTACHMENT FOR VEHICLES

[72] Inventors: Clarence E. Chaney, 907 Louis Lane, Kingsville, Md. 21087; Wendell L. Haddox, Jarrettsville, Md. 21084

[22] Filed: Oct. 27, 1970

[21] Appl. No.: 84,420

[52] U.S. Cl. .............................................. 94/50 R
[51] Int. Cl. ............................................. E01c 19/26
[58] Field of Search ......................................... 94/50

[56] References Cited

UNITED STATES PATENTS

| 2,830,511 | 4/1958 | Wills | 94/50 |
| 2,120,745 | 6/1938 | Greiner | 94/50 |
| 2,386,025 | 10/1945 | Wills | 94/50 |

FOREIGN PATENTS OR APPLICATIONS

| 890,179 | 2/1962 | Great Britain | 94/50 |

Primary Examiner—Jacob L. Nackenoff
Attorney—Clarence A. O'Brien and Harvey B. Jacobson

[57] ABSTRACT

A road patching implement in the nature of a roller attachment mountable on the front of a self-propelled vehicle. The attachment includes a roller vertically adjustable so as to transfer the weight of the forward portion of the vehicle thereto. The roller is mounted on a roller frame which is in turn vertically adjustable relative to a mounting frame. The mounting frame is releasably fixed to the vehicle. The roller is stabilized relative to the mounting frame and guided during the vertical adjustment relative thereto by means of elongated guide tubes or sleeves on the mounting frame which slidably receive elongated guide rods fixed to the roller frame. The selective vertical adjustment of the roller and roller frame is effected by power means.

8 Claims, 4 Drawing Figures

Patented May 30, 1972

Clarence E. Chaney
Wendell L. Haddox
INVENTORS

BY Clarence A. O'Brien
and Harvey B. Jacobson
Attorneys

Patented May 30, 1972

Clarence L. Chaney
Wendell L. Haddox
INVENTORS

BY Clarence A. O'Brien
and Harvey B. Jacobson
Attorneys

ROLLER-ATTACHMENT FOR VEHICLES

The invention herein is designed primarily for use in conjunction with road maintenance, and more particularly relates to a device to be utilized in patching operations wherein holes are filled with an asphaltic composition.

It is a primary intention of the instant invention to provide a compact roller unit for use in rolling road patches for a proper compressing or packing of the patching material.

In conjunction with the above object, it is a significant object of the instant invention that the device of the instant invention be in the nature of an attachment mounted directly on the front of a conventional self-propelled vehicle, normally the dump truck utilized to carry the patching material itself. In this manner, the necessity for having separate self-propelled roller equipment is eliminated. This in turn greatly reduces the expense involved in the patching operation.

The roller attachment of the instant invention, in addition to being mounted on the truck, is so positioned on the forward end thereof whereby, upon a downward adjustment of the roller into pressing engagement with the road, a transfer of the weight of the forward portion of the vehicle thereto can be effected. This is achieved through a continuing downward extension of the roller until such time as a resultant upward raising of the forward portion of the vehicle is effected. At such time, the entire weight of the forward portion of the vehicle is transferred to the roller. Inasmuch as it is contemplated the roller be used primarily in patching operations, any temporary loss of ability to steer the vehicle while the front end thereof is elevated would be of no consequence. In other words, the vehicle will normally be elevated with the roller positioned directly at the patch to be compacted and the vehicle moved forward and rearward so as to pass the roller directly over the patch sufficiently so as to achieve the desired compacting of the patching material. Incidentally, the attachment, when not in use, can either be easily removed from the vehicle or elevated above ground level whereby a free traveling of the vehicle will be possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
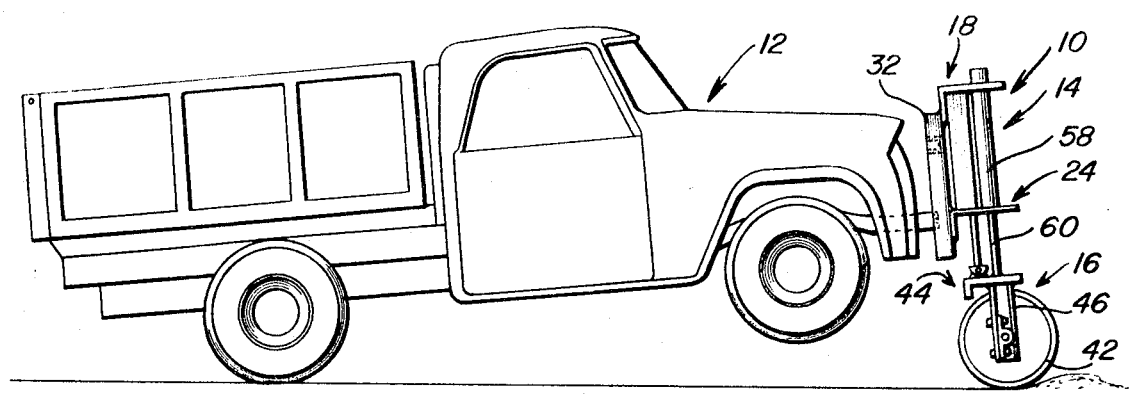
FIG. 1 is a side elevational view of a truck having the attachment of the instant invention mounted thereon and engaged with a road surface in a manner whereby the weight of the forward portion of the vehicle is supported by the roller.

Referring now more specifically to the drawings, reference numeral 10 is used to generally designate the roller attachment. The attachment 10, mountable on the forward end of a self-propelled vehicle 12, basically includes a mounting frame 14 and a roller assembly 16.

The mounting frame 14 includes an elongated upper angle member beam 18 having a rear vertical flange 20 and an upper forwardly projecting horizontal flange 22. Second beam means in the nature of a pair of aligned angle beam sections 24 is provided in spaced parallel relation below the beam 18 with each of the sections 24 including a forwardly projecting horizontal upper flange 26 and a depending rear flange 28. A frame rigidifying vertical angle upright 30 is welded to and extends vertically between the inner rear corner of each lower beam section 24 and the overlying beam 18.

The mounting of the mounting frame 14 on the vehicle 12, normally a rear wheel drive vehicle, is effected through the provision of a pair of channel-shaped vertical mounting members 32 welded to the rear faces of the upper and lower vertical beam flanges 20 and 28, one mounting member 32 extending upwardly from each of the lower beam section flanges 28. These vertical mounting members 32 are braced or further rigidified by a transverse channel shaped brace 34 extending therebetween at an intermediate point along the height thereof. The mounting members 32 are to be bolted directly to the truck or vehicle frame 36, normally subsequent to a removal of the vehicle bumper. As such, the vertical mounting members 32 will incorporate appropriate bolt holes for the engagement of mounting bolts 38 therethrough.

The roller unit 16 underlies the lower beam sections 24 and includes a roller frame 40 and an elongated cylindrical roller 42 rotatably mounted thereon. The roller frame 40 comprises a horizontal angle beam 44 paralleling the two lower beam sections 24 immediately therebelow and coextensive with the combined beam sections 24 and the space therebetween. The roller frame 40 additionally includes a pair of depending channel members 46 at the opposite end portions thereof which mount bearing units 48 which in turn rotatably receive the opposite ends of the roller shaft 50 for the rolling support of the roller 42 therebetween. As will be appreciated from the drawings, the roller frame beam 44 includes a forwardly projecting horizontal upper flange 52 and a depending rear flange 54.

Figure 2:
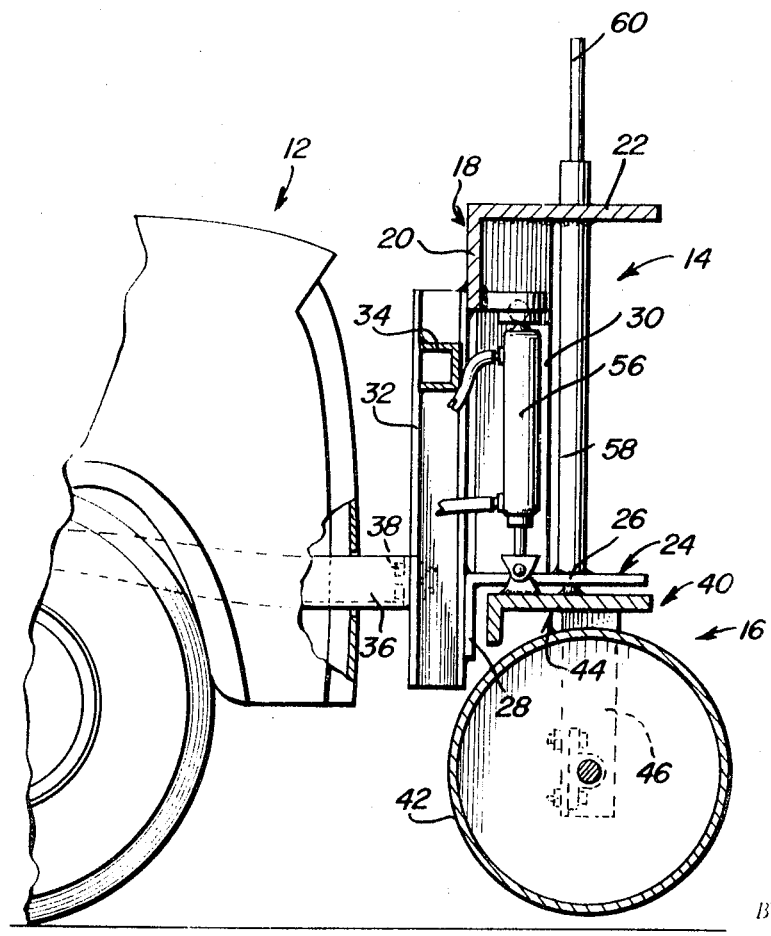
FIG. 2 is an enlarged transverse cross-sectional view through the truck mounted attachment with the roller retracted.
Figure 3:
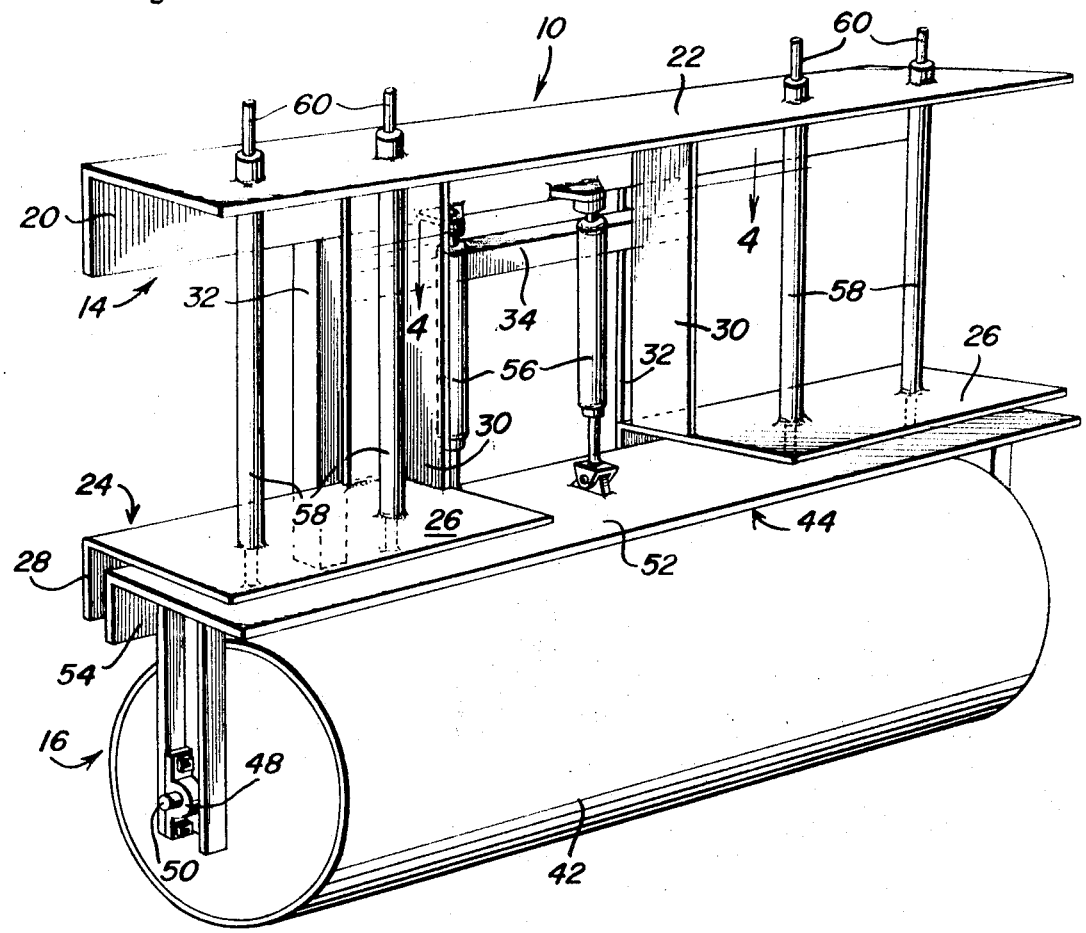
FIG. 3 is an enlarged perspective view of the attachment.
Figure 4:
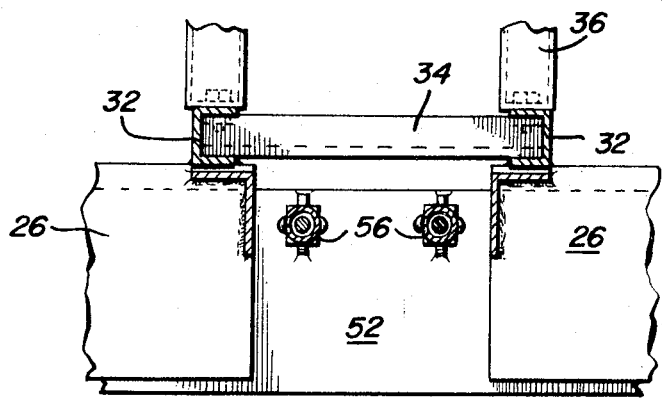
FIG. 4 is a cross-sectional detail taken substantially on a plane passing along line 4—4 in FIG. 3.

The roller unit 16 is to be vertically adjustable relative to the mounting frame 14. This is effected by the provision of appropriate jack means 56 between the upper mounting frame beam 18 and the roller frame beam 52 centrally therealong and between the lower mounting frame beam sections 24. The illustrated embodiment of the invention indicates the use of hydraulic jacks. However, other appropriate jacking means can be used. It will be noted that the illustrated jacks pivotally engage appropriate mounting ears affixed to the vertical flange 20 of the upper beam 18 and the horizontal flange 52 of the lower roller frame beam 44. With reference to FIGS. 1 and 2, the jacks 56 are to operate so as to move the roller unit between a fully retracted position above the road or ground level so as to allow for a free traveling of the vehicle 12, and an extended position wherein the front of the vehicle 12 is elevated so as to transfer the full weight of the forward portion of the vehicle to the roller 42 and thereby achieve a substantial material compacting force. As previously indicated, inasmuch as it is contemplated the attachment be used for patching purposes, any loss of steering ability to the vehicle with the front end elevated would not be of consequence.

In view of the substantial loads which are to be introduced into the attachment 10, and the desirability for a stable unit, specific provision is made for guiding the roller unit 16 during the vertical adjustment thereof and stabilizing this unit in any of its adjusted positions. Such guide means is provided by a plurality, normally four, of guide tubes or sleeves 58 welded to and extending vertically between the lower mounting frame beam sections 24 and the upper beam 18. Two such sleeves extend from each beam section 24 with all of the sleeves opening downward through the beam sections 24 and projecting slightly above the horizontal flange 22 of the upper beam 18. The roller unit in turn has an equal number of elongated guide rods 60 welded to the upper beam flange 52 and projecting vertically upward therefrom into telescopic slidable reception within the guide sleeves 58. Thus, as the roller unit 16 is vertically adjusted through the jack means 56, the guide rods 60 slide within the guide sleeves or tubes 58 and both guide and stabilize the roller unit relative to the mounting frame 14. The guide rods 60 are of course of a sufficient length so as to maintain a substantial sliding engagement with the sleeves 58 throughout the full range of adjustment of the roller unit 16.

From the foregoing, it should be appreciated that a highly unique attachment has been defined. The attachment, while of a compact and relatively simple construction, is unparalleled in its adaptability for engagement with a powered vehicle so as to utilize the drive and weight of the vehicle to achieve a mobility and material compacting weight sufficient for the performance of many tasks which heretofore required a separate self-contained power driven roller vehicle. The guide sleeves and associated rods introduce, in a unique and highly effective manner, a high degree of stability which substantially contributes to the ability of the attachment to accommodate the loads to be applied therethrough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A roller attachment for vehicles comprising a mounting frame, a roller vertically adjustable relative to said mounting frame, adjusting means for vertically adjusting said roller relative to said frame, guide means for guiding said roller during the vertical adjustment thereof and stabilizing said roller in any adjusted position thereof, and a roller frame rotatably mounting said roller, said adjusting means being engaged between said mounting frame and said roller frame for a selective extending and retracting of the roller frame relative to the mounting frame, said guide means comprising elongated guide sleeves on one of said frames and elongated guide rods on the other of said frames, said rods being telescopically slidable within said sleeves, said mounting frame comprising upper and lower parallel beam means, said roller frame underlying the lower beam means, said guide sleeves being mounted between said upper and lower beam means and opening downward toward said roller frame, said guide rods being fixed to and projecting upward from said roller frame and into said guide sleeves.

2. The attachment of claim 1 wherein said adjusting means is engaged between the upper beam means and the roller frame.

3. The attachment of claim 2 wherein said mounting frame includes vertical mounting members extending between and fixed to said upper and lower beam means, and means for securing said mounting members to a vehicle for a mounting of the roller attachment thereon.

4. The attachment of claim 2 wherein said lower beam means of the mounting frame comprises a pair of spaced aligned beam sections, said adjusting means depending from the central portion of the upper beam means and extending through the lower beam means sections for engagement with the roller frame therebelow.

5. In combination with a self-propelled vehicle, a roller attachment mounted on the front thereof, said attachment including a mounting frame fixed to said vehicle, a roller unit mounted on said mounting frame and vertically adjustable relative thereto, and adjusting means engaged between said mounting frame and roller unit for effecting a selective vertical adjustment of the roller unit downward into engagement with the ground and in a manner whereby a continuous downward adjustment of the roller unit effects a corresponding upward adjustment of the mounting frame and the vehicle to which the mounting frame is secured whereby a transfer of the weight of a portion of the vehicle to the roller unit is effected, said roller unit including a roller frame, and guide means engaged between said mounting frame and said roller frame for a guiding of the roller unit during the vertical adjustment thereof and a stabilizing of the roller unit relative to the guide means comprising elongated guide sleeves on one of said frames and elongated guide rods on the other of said frames, said rods being telescopically slidable within said sleeves, said mounting frame comprising upper and lower parallel beam means, said roller frame underlying the lower beam means, said guide sleeves being mounted between said upper and lower beam means and opening downward toward said roller frame, said guide rods being fixed to and projecting upward from said roller frame and into said guide sleeves.

6. The construction of claim 5 wherein said mounting frame comprises upper and lower parallel beam means, said roller frame underlying the lower beam means, said guide sleeves being mounted between said upper and lower beam means and opening downward toward said roller frame, said guide rods being fixed to and projecting upward from said roller frame and into said guide sleeves.

7. A roller attachment for vehicles comprising a mounting frame and a roller frame positioned therebelow for vertical adjustment relative thereto, said mounting frame comprising upper and lower parallel beam means, said roller frame underlying the lower beam means, vertical members extending between said upper and lower beam means for a rigid interconnecting thereof, first guide means mounted on and vertically between said upper and lower beam means, second guide means mounted on said roller frame and projecting vertically therefrom for guided engagement with said first guide means for a vertical guiding of the roller frame along a predetermined vertical path, and adjusting means engaged between said mounting frame and said roller frame for a controlled vertical adjustment of the roller frame relative to the mounting frame.

8. The construction of claim 7 wherein said guide means comprises elongated guide sleeves on one of said frames and elongated guide rods on the other of said frames, said rods being telescopically slidable within said sleeves.

* * * * *